United States Patent
Anderson et al.

(10) Patent No.: US 11,433,757 B2
(45) Date of Patent: Sep. 6, 2022

(54) ELECTRIC WHEEL DRIVE SYSTEM AND HYBRID VEHICLE

(71) Applicant: Autonomous Tractor Corporation, St. Michael, MN (US)

(72) Inventors: Terry Anderson, Brookings, SD (US); Robert S. Cornelius, St. Paul, MN (US)

(73) Assignee: Autonomous Tractor Corporation, St. Michael, MN (US)

( * ) Notice: Subject to any disclaimer, the term of this patent is extended or adjusted under 35 U.S.C. 154(b) by 0 days.

(21) Appl. No.: 16/945,487

(22) Filed: Jul. 31, 2020

(65) Prior Publication Data

US 2021/0031614 A1 Feb. 4, 2021

Related U.S. Application Data

(60) Provisional application No. 62/881,761, filed on Aug. 1, 2019.

(51) Int. Cl.
| | |
|---|---|
| *B60K 7/00* | (2006.01) |
| *B60K 6/365* | (2007.10) |
| *B60K 6/26* | (2007.10) |
| *B60K 6/24* | (2007.10) |
| *B60G 13/08* | (2006.01) |

(52) U.S. Cl.
CPC ............ *B60K 7/0007* (2013.01); *B60G 13/08* (2013.01); *B60K 6/24* (2013.01); *B60K 6/26* (2013.01); *B60K 6/365* (2013.01); *B60G 2202/413* (2013.01); *B60G 2202/416* (2013.01); *B60G 2300/50* (2013.01); *B60G 2400/5182* (2013.01); *B60K 2007/0092* (2013.01)

(58) Field of Classification Search
CPC .......... B60K 7/0007; B60K 6/24; B60K 6/23; B60K 6/365; B60K 2007/0092; B60K 2007/0038; B60K 2001/006; B60G 13/08; B60G 2202/413; B60G 2202/416; B60G 2300/50; B60G 2400/5182; B60G 2204/182; Y02T 10/62
See application file for complete search history.

(56) References Cited

U.S. PATENT DOCUMENTS

| | | | | |
|---|---|---|---|---|
| 5,509,497 A | * | 4/1996 | Smith | B60K 7/0015 180/308 |
| 6,516,914 B1 | * | 2/2003 | Andersen | B60K 7/0007 280/124.179 |
| 2004/0163869 A1 | * | 8/2004 | Chun | B60T 1/062 180/209 |
| 2005/0148423 A1 | * | 7/2005 | Miller | F16H 15/40 475/217 |
| 2007/0142161 A1 | * | 6/2007 | Miller | F16H 61/6649 476/4 |
| 2008/0283315 A1 | * | 11/2008 | Suzuki | B60K 6/48 180/65.51 |

(Continued)

*Primary Examiner* — Erez Gurari
(74) *Attorney, Agent, or Firm* — Kinney & Lange, P.A.

(57) ABSTRACT

An electric wheel drive system, an electric generator, a hybrid internal combustion electric vehicle, and associated methods are described that include sleeve bearings rotating on support cylinders. Fluid pumps provide lubrication and cooling. Examples include hydraulic cylinders for steering one or more electric wheel drive systems independently. Suspension is also provided to individual electric wheel drive systems independently in some examples.

27 Claims, 8 Drawing Sheets

(56) References Cited

U.S. PATENT DOCUMENTS

| | | | |
|---|---|---|---|
| 2012/0018984 A1* | 1/2012 | Oriet | B60K 17/36 |
| | | | 475/331 |
| 2014/0025241 A1* | 1/2014 | Andou | B60K 28/16 |
| | | | 701/22 |
| 2020/0276896 A1* | 9/2020 | Kawamura | B60K 6/48 |

* cited by examiner

ELECTRIC WHEEL DRIVE SYSTEM AND HYBRID VEHICLE

CLAIM OF PRIORITY

This application claims the benefit of priority under 35 U.S.C. § 119(e) to U.S. Provisional Patent Application No. 62/881,761, filed on Aug. 1, 2019, which is incorporated by reference herein in its entirety.

TECHNICAL FIELD

Various embodiments described herein relate to electric wheel drive systems. More specifically, selected embodiments described herein relate to hybrid electric vehicles.

BACKGROUND

Internal combustion engines have powered vehicles for several decades. However internal combustion power has a number of drawbacks, including pollutant byproducts from exhaust, and cost of operation. Electric propulsion systems remove the source of pollutant byproducts, however energy storage in batteries, etc. can be a technical challenge. Hybrid electric propulsions systems utilize an internal combustion engine that drives an electric generator. This configuration allows the internal combustion engine to operate at an efficient speed to improve fuel efficiency. Improved hybrid electric systems are desired.

DETAILED DESCRIPTION

In the following detailed description of the invention, reference is made to the accompanying drawings that form a part hereof and in which are shown, by way of illustration, specific embodiments in which the invention may be practiced. These embodiments are described in sufficient detail to enable those skilled in the art to practice the invention. Other embodiments may be utilized and structural, logical, and electrical changes may be made.

Figure 1:
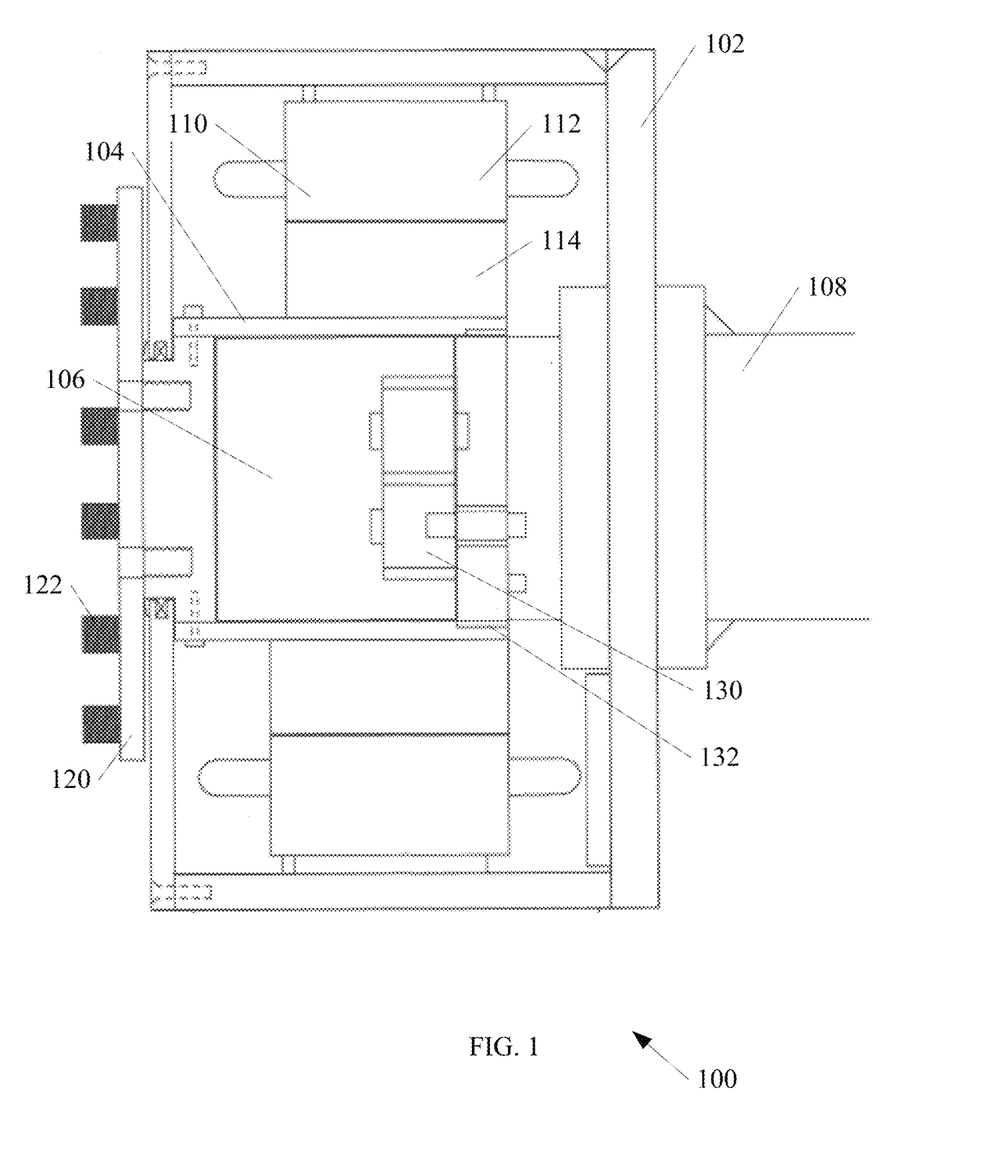
FIG. 1 shows a side view of an electric wheel drive system according to an embodiment of the invention.

FIG. 1 shows an example electric wheel drive system 100. The system 100 includes an electric motor 110 contained at least partially within a housing 102. The electric motor 110 includes a stator 112 and a rotor 114. The housing 102 is adapted for fixed operation in relation to a rotatable wheel. In the example of FIG. 1, a fixed axle 108 is shown. In one example, a rotating axle of a vehicle may be replaced with a fixed axle 108 and the housing 102 may be coupled to the fixed axle 108.

A support cylinder 106 is shown coupled to an end of the fixed axle 108. Methods of coupling include, but are not limited to, one or more bolts passing through the support cylinder 106 and threading into an end of the fixed axle 108. In the example shown, the support cylinder 106 and the fixed axle 108 do not rotate with respect to a vehicle frame.

A sleeve bearing 104 is shown located over the support cylinder 106 and rotatable about the support cylinder 106. A wheel mounting interface 120 is coupled to the sleeve bearing 104. In one example the wheel mounting interface 120 includes one or more lug bolts 122, although the invention is not so limited. Other fasteners for wheel mounting, such as splines, female threaded holes, etc. are also possible mounting interfaces.

In operation, the sleeve bearing 104 rotates over the support cylinder 106 when driven by the electric motor 110. In one example, the support cylinder 106 includes a polished chrome coated cylinder. In one example, the sleeve bearing 104 includes a honed inner surface to mate with the support cylinder 106 and provide a robust bearing surface. Lubrication may be provided as described in more detail below. The wheel mounting interface 120 is driven as a result of direct coupling to the sleeve bearing 104. In other examples, a gear reduction may be included between the sleeve bearing 104 and the wheel mounting interface 120 as discussed in more detail below.

Configurations of electric wheel drive systems 100 as described above provide a number of advantages. One advantage includes simplicity of manufacture. A sleeve bearing 104 may be fabricated with a minimum number of moving parts. For example, no bearing balls or cone surfaces are required. As a result, a sleeve bearing 104 is also a robust design that requires minimal maintenance. Configurations shown are also capable of supporting large loads due to the large surface area bearing surfaces in the sleeve bearing 104 and support cylinder 106. The system 100 described can be easily retrofitted onto an existing vehicle, merely be replacing a rotating axle with a fixed axle.

FIG. 1 further shows a fluid pump 130 located within the sleeve bearing 104. In the example shown, the fluid pump 130 is driven by a gear interface 132 located on a portion of the sleeve bearing 104. In one example, the gear interface 132 is recessed within an inner surface of the sleeve bearing 104, allowing the sleeve bearing 104 to slide over the support cylinder 106 during assembly or maintenance without interference from the gear interface 132.

In one example rotation of the sleeve bearing 104 drives the fluid pump 130 and provides lubrication to an interface between the sleeve bearing 104 and the support cylinder 106. In one example, the fluid includes a suitable oil for both lubrication and operation of one or more hydraulic cylinders. In one example the fluid driven by the fluid pump 130 may also be used to cool one or more electronic components, such as the electric motor 110. Fluid driven by the fluid pump 130 may be routed away from the system 100 though hydraulic lines to a radiator and/or a reservoir for cooling. This feature is discussed in more detail under FIG. 7.

Figure 2:
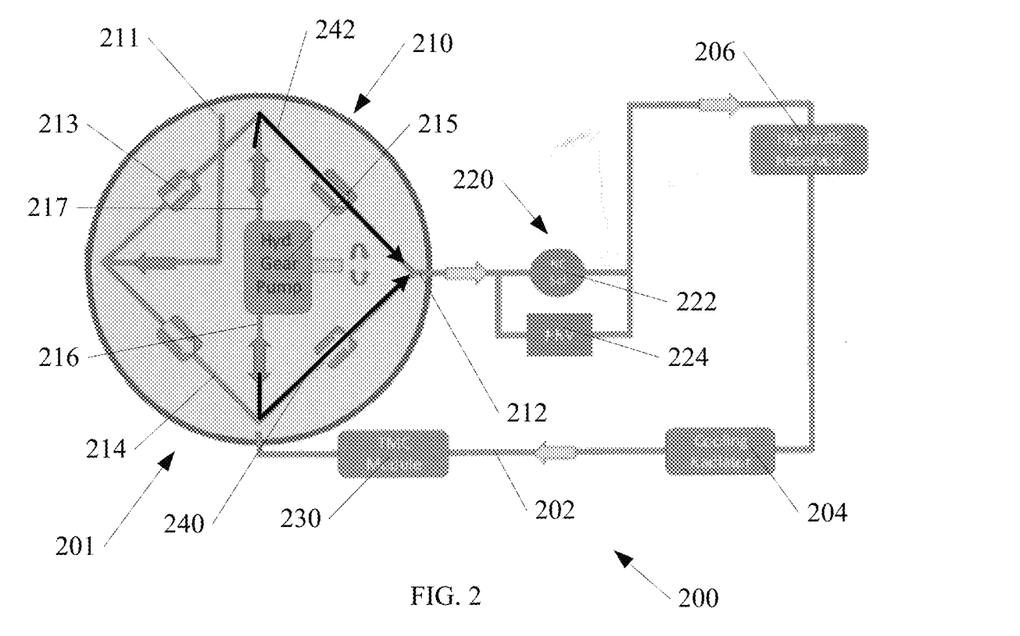
FIG. 2 shows a block diagram of portions of an electric wheel drive system according to an embodiment of the invention.

FIG. 2 shows an example of other aspects of an electric wheel drive system 200 according to embodiments of the invention. Aspects of the system 100 from FIG. 1 may optionally be combined with aspects of system 200.

The system 200 includes a drive unit 210 such as an electric motor, or other element connected to an electric motor, such as sleeve bearing 104. The drive unit 210 further includes a fluid pump 215 that is in turn connected to a reservoir 206 through hydraulic lines 202. In one example, a radiator 204 is further connected to the system 200. A torque controller 230 is further shown coupled to the system 200.

One example of a fluid pump 215 includes a gear pump. Other examples such as vane pumps, etc. are also within the scope of the invention. In one example, the fluid pump 215 is coupled to the drive unit 210, for example using gear interface 132 as shown in the example of FIG. 1. Other mechanisms of coupling are also within the scope of the invention. In operation, the fluid pump 215 rotates and drives hydraulic fluid in response to motion by a wheel or component such as sleeve bearing 104.

In one example, flow controls 201 are provided to provide forward flow from the fluid pump 215 when the drive unit 210 operates in either a forward rotation or a backward rotation. A first inlet/outlet 216 is shown coupled to the fluid pump 215, and a second inlet/outlet 217 is also shown coupled to the fluid pump 215. In operation, if the drive unit 210 is rotating a forward direction then the first inlet/outlet 216 is operating as an outlet, and the second inlet/outlet 217 is operating as an inlet. Likewise, if the drive unit 210 is rotating a reverse direction then the first inlet/outlet 216 is operating as an inlet, and the second inlet/outlet 217 is operating as an outlet.

In the example of FIG. 2, the flow controls 201 include a plurality of check valves 213 coupled to the first inlet/outlet 216 and the second inlet/outlet 217 through hydraulic lines 214. Arrows on the check valves 213 indicate the allowed direction of flow through the check valves 213. In operation, if the first inlet/outlet 216 is operating as an outlet, then the check valves 213 drive flow of hydraulic fluid along arrow 240 to node 212. In operation, if the second inlet/outlet 217 is operating as an outlet, then the check valves 213 drive flow of hydraulic fluid along arrow 242 to node 212. While hydraulic fluid is being driven to node 212 by either forward rotation or reverse rotation, new fluid is being supplied into the system through supply line 211.

The example configuration of check valves and hydraulic lines of FIG. 2 illustrates one possible system that provides forward flow from the hydraulic pump 215 to the node 212 in either a forward rotation or a backward rotation. The illustrated configuration includes four check valves arranged as shown in FIG. 2. Other examples may use other numbers of check valves or other components apart from check valves, such as actuated valves, etc. in different configurations.

FIG. 2 further shows a braking system 220 coupled to the flow controls 201 from node 212. FIG. 2 shows a user operated brake valve 222. In one example, the user operated brake valve 222 may be opened, closed, or modulated to provide a selected level of constriction to flow from the node 212. In one example the control of a level of constriction provides a braking force that controls a speed of a vehicle using propulsion systems according to examples disclosed. In other examples the flow from the node 212 may be selectively used to provide power to a hydraulic cylinder to actuate a mechanical brake such as a disk and caliper or the like. Other mechanical braking configurations are also within the scope of the invention.

FIG. 2 further shows an emergency brake 224 according to examples of the invention. In one example, the user operated brake valve 222 may include a normally closed valve, that is held open using a powered control such as a solenoid. In the event of a power loss in a vehicle, it is desirable to be able to control braking, or to have brakes applied to stop a vehicle in an emergency loss of power. In one example, the emergency brake 224 is a pressure relief valve with an appropriate setting. If power to the user operated brake valve 222 is lost, then the valve reverts to normally closed, and diverts pressure through the emergency brake 224. An amount of resistance (pressure relief) may be selected to provide an appropriate stopping distance, without stopping too abruptly. An advantage to this configuration includes the ability to stop in the event of emergency power loss. Another advantage of this configuration is that due to the configuration of flow controls 201, there will always be a forward flow of fluid at node 212. In this way, both the user operated brake valve 222, and the emergency brake 224 will operate when the vehicle is travelling in a forward direction, or in a reverse direction.

Figure 3A:
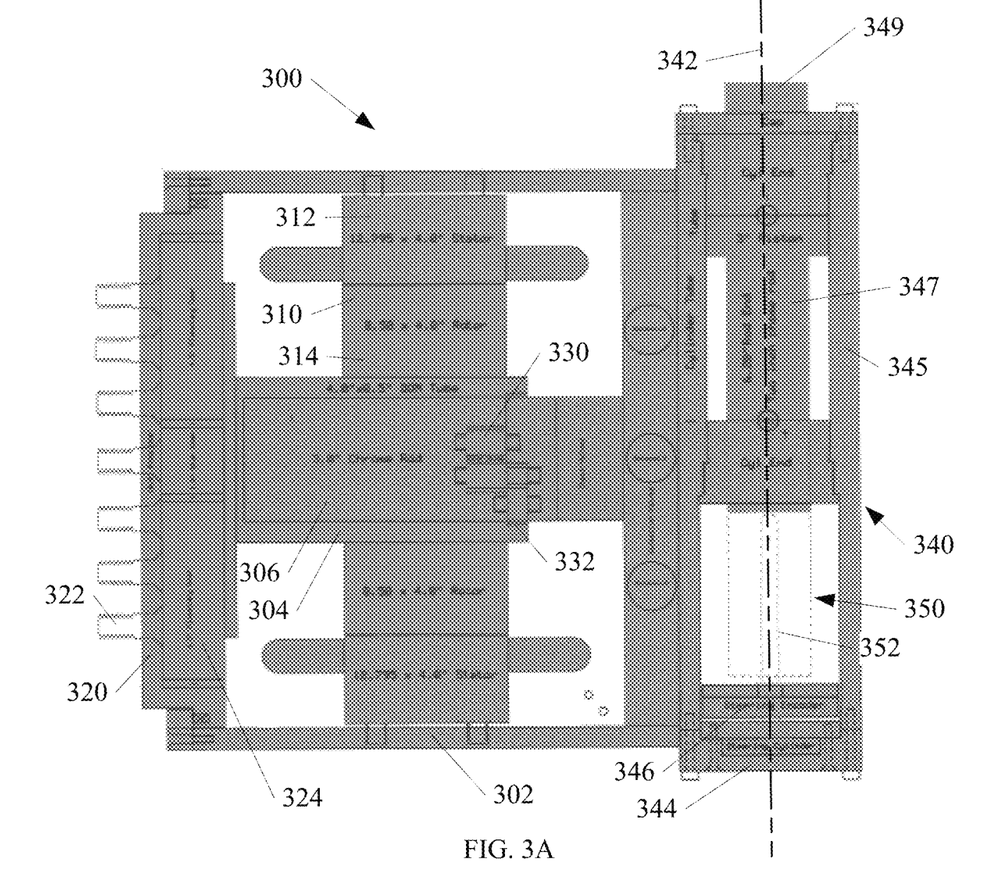
FIGS. 3A-C show a side view of another electric wheel drive system according to an embodiment of the invention.

FIG. 3A shows another example of an example electric wheel drive system 300. The system 300 includes an electric motor 310 contained at least partially within a housing 302. The electric motor 310 includes a stator 312 and a rotor 314. The housing 302 is adapted for fixed operation in relation to a rotatable wheel.

In the example of FIG. 3A, a support cylinder 306 is coupled to the housing 302. In the example shown, the support cylinder 306 does not rotate with respect to a rotating wheel. However, the support cylinder 306 is capable of limited motion for steering function, described in more detail below.

A sleeve bearing 304 is shown located over the support cylinder 306 and rotatable about the support cylinder 306. A wheel mounting interface 320 is coupled to the sleeve bearing 304. In one example the wheel mounting interface 320 includes one or more lug bolts 322, although the invention is not so limited. Similar to the example of FIG. 1, other fasteners for wheel mounting, such as splines, female threaded holes, etc. are also possible mounting interfaces.

In operation, the sleeve bearing 304 rotates over the support cylinder 306 when driven by the electric motor 310. In one example, the support cylinder 306 includes a polished chrome coated cylinder. In one example, the sleeve bearing 304 includes a honed inner surface to mate with the support cylinder 306 and provide a robust bearing surface. In one example, the sleeve bearing 304 includes a "drawn over mandrel" (DOM) cylinder that results in tight tolerances needed for a bearing, at a cost effective price. Lubrication may be provided by fluid pump 330 similar to pump 130 described in FIG. 1. In the example shown, the fluid pump 330 is driven by a gear interface 332 located on a portion of the sleeve bearing 304. The gear interface 332 may be recessed within an inner surface of the sleeve bearing 304, as described with respect to FIG. 1.

The example of FIG. 3A further shows a gear reduction 324 coupled between the sleeve bearing 304 and the wheel mounting interface 320. One example of a gear reduction includes a planetary gear system, although the invention is not so limited. Other gear reduction systems may include a harmonic drive, two or more cogs, etc. In one example, a planetary gear reduction provides a desired amount of power in a compact amount of space. In the example of FIG. 3A, a planetary gear reduction is relatively flat, and fits between the sleeve bearing 304 and the wheel mounting interface 320.

In the example of FIG. 3A, the housing 302 is coupled to a hydraulic cylinder 340. In the example shown, the hydraulic cylinder 340 is capable of both steering and providing suspension.

Figures 3B, 3C:
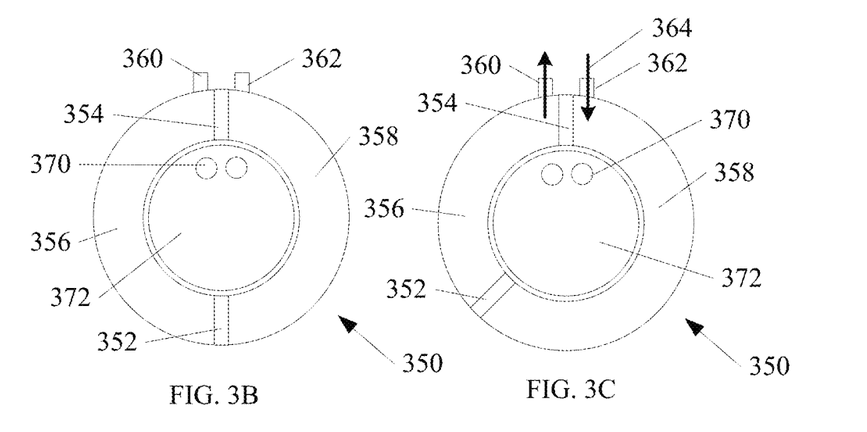

The hydraulic cylinder 340 includes a cylinder housing 345 and a cylinder piston 347, and is shown with a cylinder axis 342 about which the cylinder housing 345 and attached housing 302 may rotate to provide steering for the system 300. In operation, a steering actuator may be actuated to cause rotation about the cylinder axis 342. One example of a steering actuator 350 is illustrated in FIGS. 3B and 3C. Although the steering actuator 350 provides a number of advantages, the invention is not so limited. Other steering actuators may include, but are not limited to, a steering linkage, such as a mechanical linkage, rack and pinion, hydraulic cylinder, electric linear actuator, etc.

The steering actuator 350 in FIGS. 3B and 3C include a first chamber 356 and a second chamber 358 that is divided by a stationary vane 354 and a moving vane 352. Hydraulic fluid enters and leaves the chambers 356, 358 through ports 360, 362. The example of FIG. 3B shows the steering actuator 350 in a first rotational state. The moving vane 352 is located directly across from the stationary vane 354. However, in a steering operation, hydraulic fluid may enter port 362 and corresponding hydraulic fluid may exit port 360, as illustrated in FIG. 3C. In such an operation, the second chamber 358 increases in volume, and the first chamber 356 reduces in volume as shown in FIG. 3C. The change in volume is accomplished by repositioning the moving vane 352.

In the illustration of FIG. 3A, the cylinder piston 347 is coupled to a vehicle frame, and adjustments of hydraulic fluid through ports 360, 362 will cause rotation of the cylinder housing 345 as shown in FIGS. 3B and 3C. In this way, steering of the housing 302, and the system 300 may be accomplished. Notably, in the example of FIGS. 3A-3C, the cylinder piston 347 is able to move up and down to provide suspension, while simultaneously rotating as described above, to provide steering.

In one example, a rotational position sensor 346 is included to provide feedback information to a navigation circuit in vehicle controls (not shown). One example of a rotational position sensor 346 includes a rotary encoder, although the invention is not so limited. In operation, the steering actuator causes rotation of the cylinder housing 345 and attached housing 302 to turn the system 300 about the cylinder axis 342. The rotational position sensor 346 may then provide feedback to a navigation circuit that evaluates an actual steering position of the system 300. Actuation of the steering actuator may then be fine tuned as needed based on the feedback from the rotational position sensor 346.

In one example the hydraulic cylinder 340 further provides a suspension function. Linear motion of the cylinder piston 347 along the cylinder axis 342 provides suspension related to the system 300. In one example, four or more systems 300 are used to provide four or more wheels to a vehicle. In such a configuration, each system 300 with each associated wheel may be individually monitored for suspension control.

In one example one or more suspension sensors 344 are included in the system 300. In one example, a suspension sensor includes a pressure sensor, although other sensor types, such as linear encoders may be used. In a pressure sensor example, hydraulic fluid pressure within the hydraulic cylinder 340 is monitored, and control of the hydraulic fluid pressure provides necessary suspension. For example, if a rock is encountered by a wheel during vehicle operation, pressure in a lower chamber of the hydraulic cylinder 340 will rise. This rise will be detected by the suspension sensor 344, and the cylinder piston 347 will be moved in response. Linear motion of the cylinder piston 347 upward in response to hitting a rock will provide the desired suspension. Then return of the cylinder piston 347 can be actuated by feedback in response to changes in hydraulic fluid pressure after the rock has been cleared.

In the example of FIGS. 3A-3C, the hydraulic cylinder 340 is hollow. FIGS. 3B and 3C illustrate the hollow central region 372. In one example, one or more control lines 370 are routed through the hollow central region 372 of the hydraulic cylinder 340 up to a top portion 349 of the cylinder piston 347. Examples of control lines 370 include, but are not limited to, electrical power lines for the motor 310, feedback control lines for the sensors 344, 346, hydraulic fluid lines from the fluid pump 330, etc. The use of a hollow cylinder provides clean outward appearance of the system 300, protection from damage for control lines 370, and safety for users (for example from motor power lines).

Figure 4:
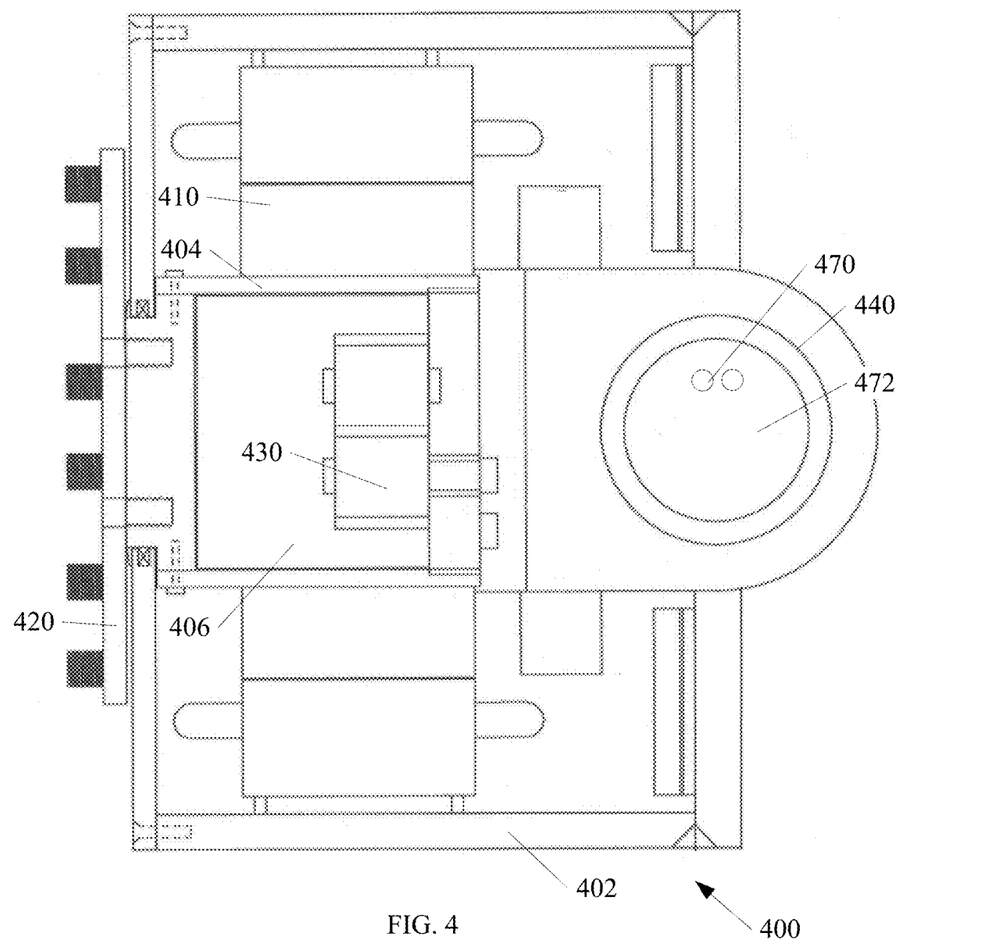
FIG. 4 shows a top view of another electric wheel drive system according to an embodiment of the invention.

FIG. 4 shows a top view of another electric wheel drive system 400, similar to system 300. In the top view of FIG. 4, control lines 470 are illustrated running through a hollow central region 472 of a hydraulic cylinder 440. Similar to the example of FIG. 3, the system 400 includes a sleeve bearing 404 running over a support cylinder 406, with a fluid pump 430 housed within the support cylinder 406. An electric motor 410 is shown within a housing 402 driving the sleeve bearing 404, which in turn drives a wheel mounting interface 420.

Figure 5:
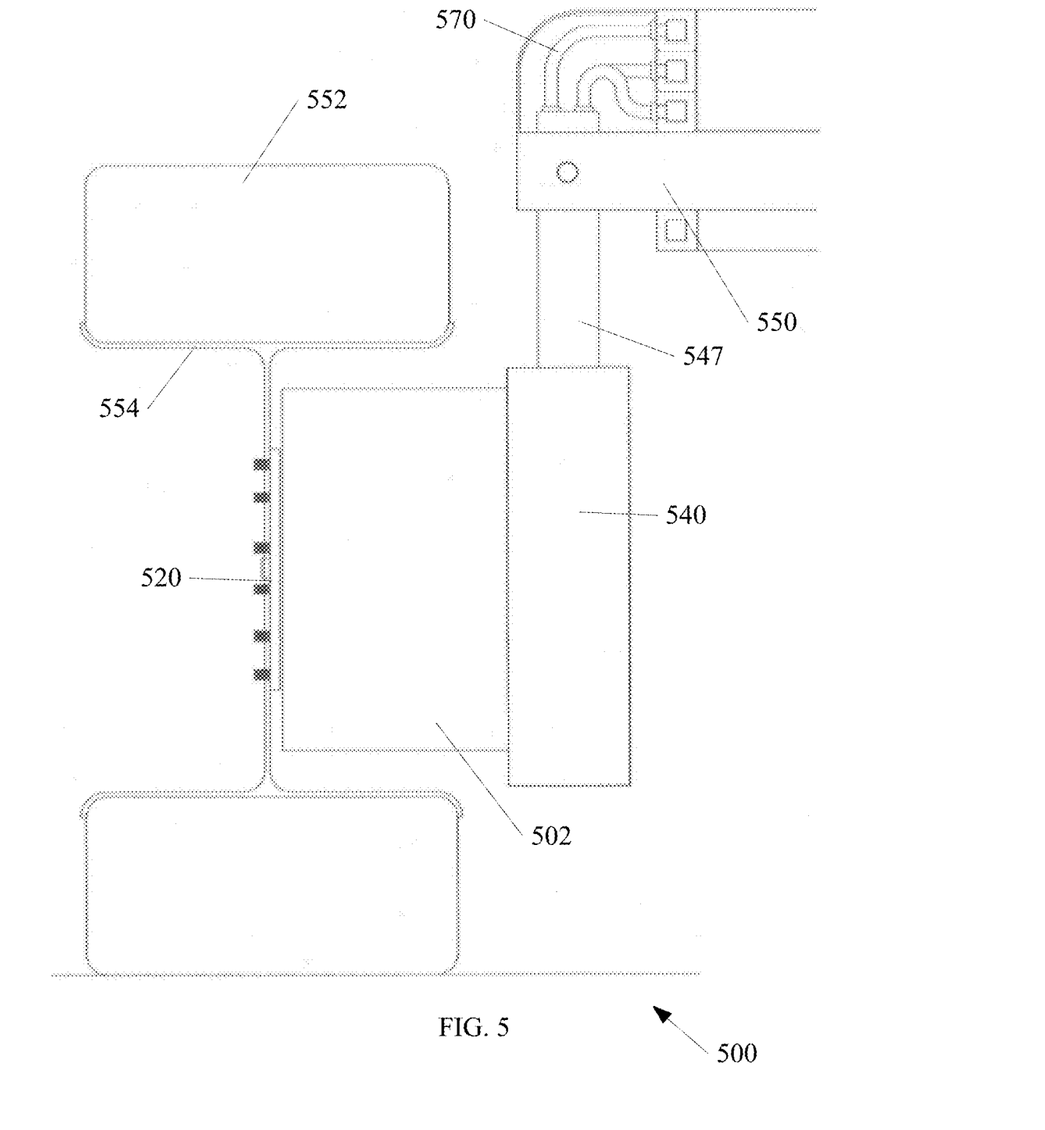
FIG. 5 shows a side view of another electric wheel drive system according to an embodiment of the invention.

FIG. 5 illustrates an example of an electric wheel drive system 500 coupled to a vehicle frame 550. In the example of FIG. 5, a housing 502 is visible coupled to a hydraulic cylinder 540. The housing 502 and hydraulic cylinder 540 may be similar to the housing 302 and hydraulic cylinder 340 described in embodiments above. A cylinder piston 547 is shown coupled between the housing 502 and the vehicle frame 550. As described above, this configuration provides both suspension and steering capability to the system 500. A number of control lines 570 are shown exiting the cylinder piston 547 and continuing on within the vehicle frame 550. FIG. 5 further illustrates a wheel coupled to a wheel mounting interface 520. In the example shown, a rim 554 is bolted to the wheel mounting interface 520, and a tire 552 is mounted to the rim 554. Other wheel types are also within the scope of the invention.

Figure 6A:
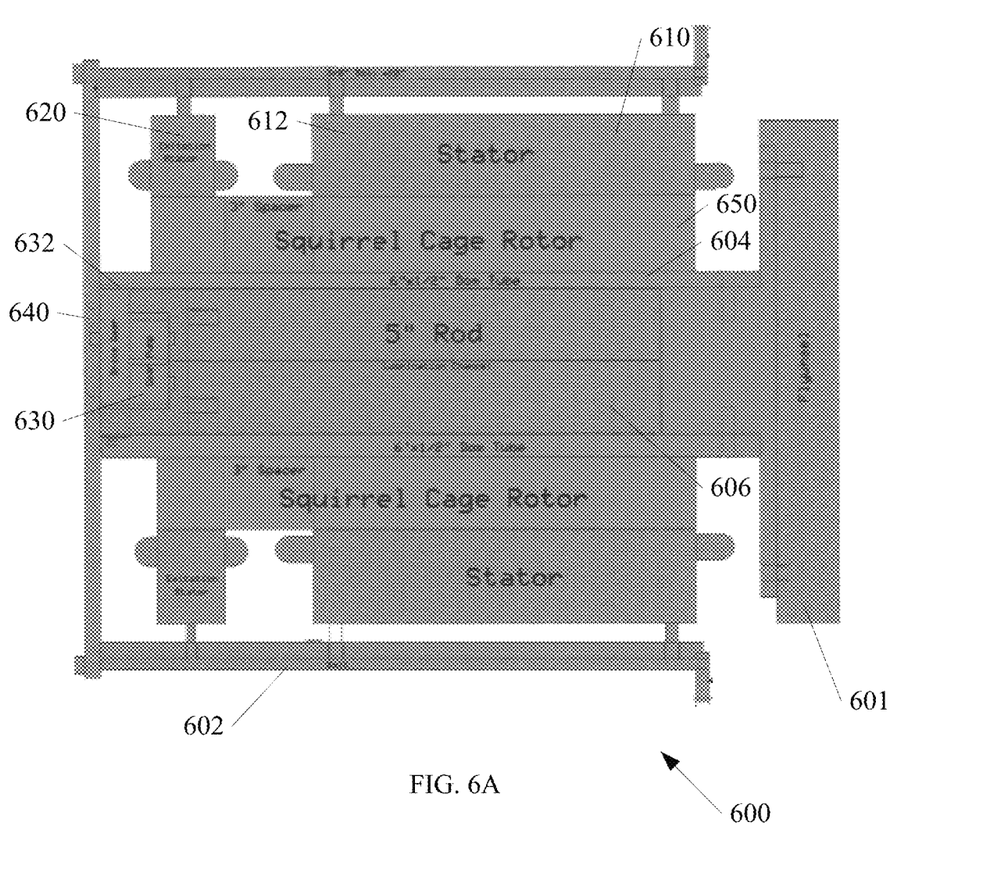
FIG. 6A shows a side view of an electric generator according to an embodiment of the invention.

FIG. 6A shows an example electric generator 600 for use in selected systems and vehicles. In one example, the generator 600 includes a rotor 650 that is comprised of multiple portions as described in more detail below. In one example the generator 600 further includes a primary stator 610. In one example, the generator 600 further includes an excitation stator 620. In the example of FIG. 6, the primary stator 610 and the excitation stator 620 are commonly coupled to a housing 602 are held in fixed relation to a support cylinder 606. The primary stator 610 and the excitation stator 620 are shown contained at least partially within the housing 602.

Figure 6B:
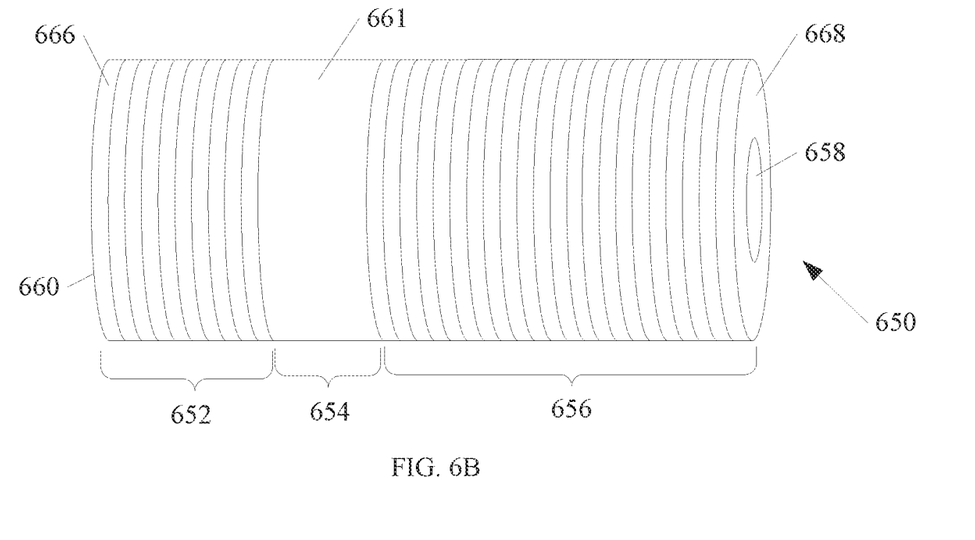
FIG. 6B shows an isometric view of selected components of an electric generator according to an embodiment of the invention.

FIG. 6B shows additional detail of the rotor 650 from the electric generator 600 shown in FIG. 6A. The rotor 650 includes a primary rotor portion 656 and an excitation rotor portion 652. In the example shown, the primary rotor portion 656 includes a number of first ferrous laminations 660. In one example, the ferrous laminations 660 are formed from steel, although other ferrous materials such as iron, etc. are also within the scope of the invention. In one example, a number of individual vanes 662 are included in the ferrous lamination 660, separated by spaces 664. In one example, within the rotor 650, each ferrous lamination 660 is embedded in a continuous conductor matrix. Examples of a continuous conductor matrix include, but are not limited to, copper and aluminum. In one example, the rotor 650 may be described as a "squirrel cage" rotor.

The continuous conductor matrix passes through spaces 664 and forms bars of conductor material that extend laterally through the number of laminations 660 along the rotor 650. FIG. 6B further shows a first end cap 666 and a second end cap 668. In one example, the first end cap 666 and the second end cap 668 complete a conduction pathway between bars of conductor material within the rotor 650.

FIG. 6B further shows the primary rotor portion 656 laterally separated from the excitation rotor portion 652 by a lateral distance greater than a distance between the ferrous laminations 660. In one example, a separation portion 654 is three inches, for a 6.5 inch diameter sleeve bearing 604 although the invention is not so limited. In one example, the separation portion 654 for other sized configurations may be proportionally sized with respect to other sleeve bearing diameters. In one example, the separation portion 654 includes a dielectric. In one example, then separation portion 654 includes laminations, such as ferrous laminations 660. In one example, the separation portion 654 includes spaces (not shown) that correspond to spaces 664. As such, the bars formed by the conductor material continue from the first end cap 666, laterally across the excitation rotor portion 652, through the separation portion 654, through the primary rotor portion 656, and into the second end cap 668.

In operation, the rotor 650 turns both the primary rotor portion 656 and the excitation rotor portion 652. Because the bars formed in the rotor 650 by the conductor material are continuous from the excitation rotor portion 652, through the separation portion 654, and into the primary rotor portion 656, the excitation rotor portion 652 will provide excitation directly to the primary rotor portion 656 and the primary stator 610.

The excited magnetic field then contributes to power supplied by the electric generator 600. In the configuration shown in FIG. 6A, the integrated primary rotor portion 656 and excitation rotor portion 652 simplifies the manufacture of the rotor 650, and provides a more efficient operation of the electric generator 600.

In the example of FIG. 6, a support cylinder 606 is coupled to the housing 602. FIG. 6B shows a central bore 658 of the rotor 650 that is adapted to fit over the sleeve bearing 604, as shown in FIG. 6A. In FIG. 6A, the sleeve bearing 604 is shown located over the support cylinder 606 and rotatable about the support cylinder 606. In operation, the sleeve bearing 604 is driven by an output of an internal combustion engine 601. Power from the generator 600 is output through terminals 640. In one example a hybrid vehicle is powered by a combination of an internal combustion engine that drives a generator as shown in FIG. 6. Electricity provided from the generator 600 is then routed to one or more electric wheel drive systems as illustrated in examples above.

Similar to sleeve bearing descriptions above, in one example, the support cylinder 606 includes a polished chrome coated cylinder. In one example, the sleeve bearing 604 includes a honed inner surface to mate with the support cylinder 306 and provide a robust bearing surface. As described in examples above, in one example, the sleeve bearing 604 includes a "drawn over mandrel" (DOM) cylinder that results in tight tolerances needed for a bearing, at a cost effective price. Lubrication may be provided by fluid pump 630 similar to other fluid pumps described in the present disclosure. In the example shown, the fluid pump 630 is driven by a gear interface 632 located on a portion of the sleeve bearing 604. The gear interface 632 may be recessed within an inner surface of the sleeve bearing 604. In one example, multiple fluid pumps are located in various places throughout a vehicle (any of various electric wheel drive systems, generators, etc.) Multiple fluid pumps provide localized fluid pressure where needed, and provide redundancy in the event one or more other fluid pumps were to fail.

Figure 7:
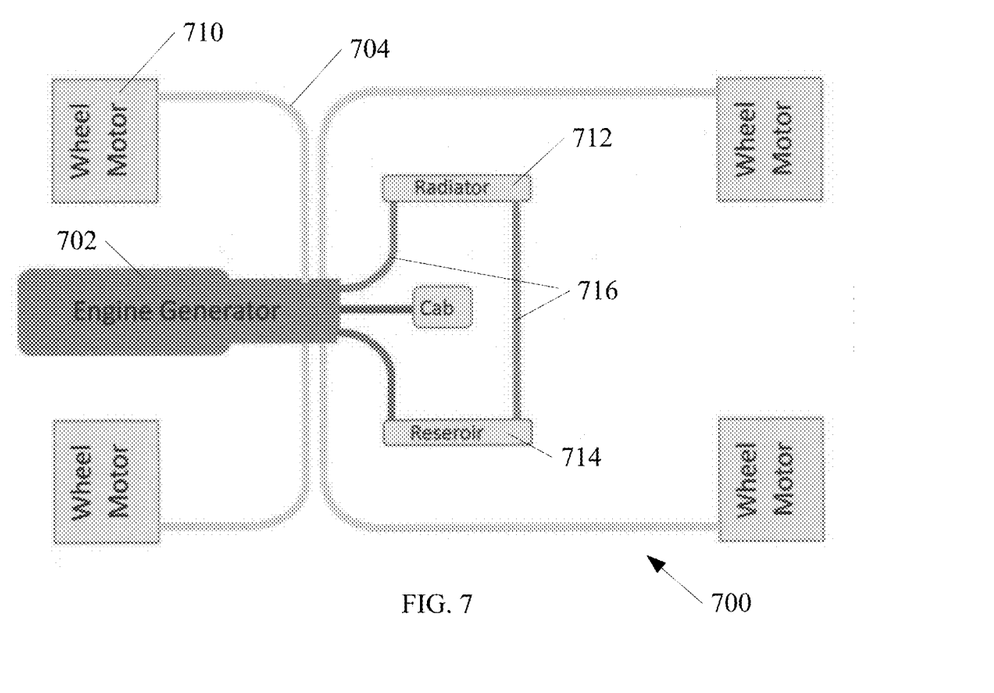
FIG. 7 shows a block diagram of a hybrid internal combustion electric vehicle according to an embodiment of the invention.

FIG. 7 shows an overview of an example hybrid internal combustion electric vehicle 700. An internal combustion engine and generator 702 is shown coupled to multiple electric wheel drive systems 710. Examples of electric wheel drive systems that may be included in location 710 are shown in various examples of the present disclosure (100, 300, 400, 500, etc.). Lines 704 are shown coupled from the internal combustion engine and generator 702 to the various electric wheel drive systems 710. Examples of lines include, but are not limited to, electrical power lines, hydraulic lines, feedback control lines, etc. The vehicle 700 of FIG. 7 further shows a central radiator 712 and a hydraulic reservoir 714. In one example fluid from multiple hydraulic components is routed through the radiator 712 for cooling, and excess hydraulic fluid is stored in the reservoir 714. The radiator 712 and reservoir 714 are shown coupled to the rest of the vehicle components (electric wheel drive systems 710, internal combustion engine and generator 702) through hydraulic lines 716. In one example, one supply of hydraulic fluid (oil or other suitable fluid) is used for lubrication, hydraulic actuation, and cooling of electrical components such as wheel motors and/or control circuitry.

Figure 8:
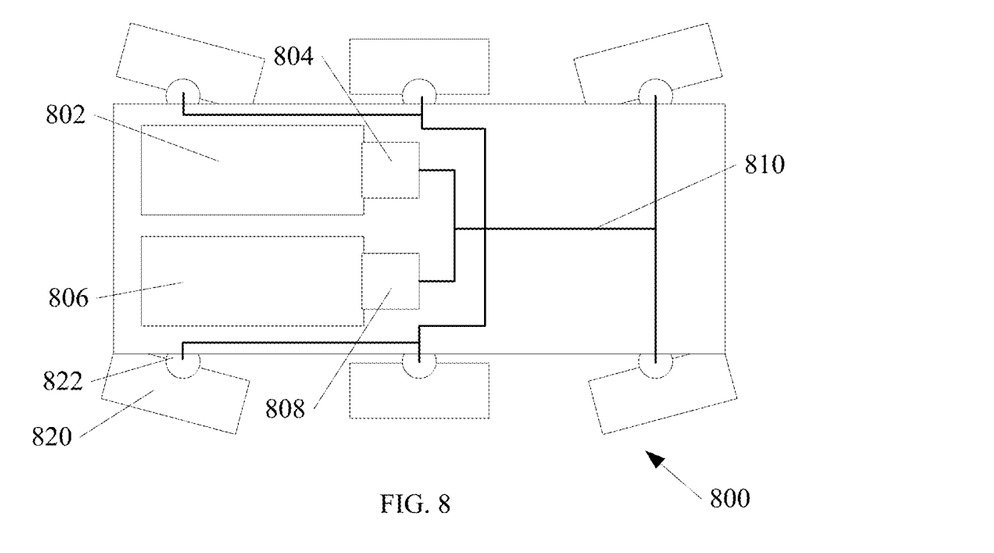
FIG. 8 shows a top view block diagram of a hybrid internal combustion electric vehicle according to an embodiment of the invention.

FIG. 8 shows a top view block diagram of another example hybrid internal combustion electric vehicle 800. Multiple internal combustion engines 802 are shown coupled to multiple generators 804. In the example of FIG. 8, two internal combustion engines 802 and two corresponding generators 804 provide redundancy and cost effective manufacture. Because the generators 804 may be wired in parallel, two smaller and less expensive internal combustion engines 802 and generators 804 may be used in place of a single larger internal combustion engines 802 and generator 804.

Lines 810 are shown connecting multiple electric wheel drive systems 820. Examples of lines 810 include, but are not limited to electrical power lines, hydraulic lines, feedback control lines, etc. In the example of FIG. 8, each electric wheel drive system 820 is coupled to the vehicle 800 using a hydraulic cylinder 822. As described in selected examples above, the hydraulic cylinder 822 provides individual steering capability, and may provide individual suspension capability. FIG. 8 illustrates improved steering that is facilitated by each electric wheel drive system 820 including individual steering control. As can be seen from the Figure, rear wheels can steer independent of front wheel, and center wheels can be left neutral. This provides improved maneuverability and control over conventional front wheel only steering. Although one possible improved steering maneuver is illustrated in FIG. 8, the invention is not so limited. Other maneuvers such as all wheels moving sideways are also uniquely possible when each electric wheel drive system 820 is capable in individual steering.

To better illustrate the method and apparatuses disclosed herein, a non-limiting list of embodiments is provided here:

Example 1 is an electric wheel drive system. The system includes an electric motor, a housing adapted for fixed operation in relation to a rotatable wheel, the housing at least partially enclosing the electric motor, a sleeve bearing, driven by the electric motor, wherein the sleeve bearing is rotatable about a support cylinder, wherein the support cylinder is fixed in relation to the housing, and a wheel mounting interface coupled to the sleeve bearing.

Example 2 includes the electric wheel drive system of example 1, further including a gear reduction between the sleeve bearing and the wheel mounting interface.

Example 3 includes the electric wheel drive system of any one of examples 1-2, wherein the gear reduction includes a planetary gear assembly.

Example 4 includes the electric wheel drive system of any one of examples 1-3, further including a fluid pump located within the sleeve bearing, wherein rotation of the sleeve bearing drives the fluid pump.

Example 5 includes the electric wheel drive system of any one of examples 1-4, wherein the fluid pump is adapted to pump lubricating oil, and wherein a portion of the lubricating oil lubricates an interface between the sleeve bearing and the support cylinder.

Example 6 includes the electric wheel drive system of any one of examples 1-5, further including flow controls coupled to the fluid pump, the flow controls configured to provide forward flow from the fluid pump in either a forward rotation or a backward rotation of the sleeve bearing.

Example 7 is an electric wheel drive system. The system includes an electric motor, a housing adapted for fixed operation in relation to a rotatable wheel, the housing at least partially enclosing the electric motor, a sleeve bearing, driven by the electric motor, wherein the sleeve bearing is rotatable about a support cylinder, wherein the support cylinder is fixed in relation to the housing, a wheel mounting interface coupled to the sleeve bearing, and a hydraulic cylinder coupled to the housing, wherein the housing and wheel are configured to steer a vehicle by rotation about a cylinder axis of the hydraulic cylinder, and wherein linear travel of the hydraulic cylinder is configured to provide suspension for the vehicle.

Example 8 includes the electric wheel drive system of example 7, further including a rotational position sensor for monitoring and controlling a steering angle.

Example 9 includes the electric wheel drive system of any one of examples 7-8, further including a sensor for suspension.

Example 10 includes the electric wheel drive system of any one of examples 7-9, wherein the sensor for suspension includes a pressure sensor in communication with hydraulic fluid within the hydraulic cylinder.

Example 11 includes the electric wheel drive system of any one of examples 7-10, wherein the hydraulic cylinder includes a hollow piston, and wherein control wiring for the rotational position sensor and the sensor for suspension are routed through a center of the hollow piston.

Example 12 includes the electric wheel drive system of any one of examples 7-11, further including a fluid pump located within the sleeve bearing, wherein rotation of the sleeve bearing drives the fluid pump.

Example 13 includes the electric wheel drive system of any one of examples 7-12, wherein the fluid pump is adapted to pump lubricating oil, and when in operation, a portion of the lubricating oil lubricates an interface between the sleeve bearing and the support cylinder.

Example 14 includes the electric wheel drive system of any one of examples 7-13, wherein a portion of the lubricating oil is diverted to operate a suspension function of the hydraulic cylinder.

Example 15 is a hybrid internal combustion electric vehicle. The vehicle includes an internal combustion engine, an electric generator coupled to an output shaft of the internal combustion engine, and one or more electric wheel drive systems mechanically coupled to a vehicle frame, and electrically coupled to the electric generator. The electric wheel drive system includes an electric motor, a housing adapted for fixed operation in relation to a rotatable wheel, the housing at least partially enclosing the electric motor, a sleeve bearing, driven by the electric motor, wherein the sleeve bearing is rotatable about a support cylinder, wherein the support cylinder is fixed in relation to the housing, and a wheel mounting interface coupled to the sleeve bearing.

Example 16 includes the hybrid internal combustion electric vehicle of example 15, further including multiple internal combustion engines and corresponding electric generators electrically wired in parallel.

Example 17 includes the hybrid internal combustion electric vehicle of any one of examples 15-16, wherein the one or more electric wheel drive systems, includes at least four electric wheel drive systems, wherein each electric wheel drive systems is configured to be independently steered.

Example 18 includes the hybrid internal combustion electric vehicle of any one of examples 15-17, further including a hydraulic cylinder coupled between each housing and the vehicle frame, wherein the housing and wheel are configured to steer a vehicle by rotation about a cylinder axis of each hydraulic cylinder, and wherein linear travel of each hydraulic cylinder is configured to provide suspension for the vehicle.

Example 19 includes the hybrid internal combustion electric vehicle of any one of examples 15-18, further including a fluid pump located within the sleeve bearing, wherein rotation of the sleeve bearing drives the fluid pump.

Example 20 includes the hybrid internal combustion electric vehicle of any one of examples 15-19, wherein the fluid pump is adapted to pump lubricating oil, and when in operation, a portion of the lubricating oil lubricates an interface between the sleeve bearing and the support cylinder.

Example 21 includes the hybrid internal combustion electric vehicle of any one of examples 15-20, wherein a portion of the lubricating oil is diverted to operate a suspension function of the hydraulic cylinder.

Example 22 includes the hybrid internal combustion electric vehicle of any one of examples 15-21, further including flow controls coupled to the fluid pump, the flow controls configured to provide forward flow from the fluid pump in either a forward rotation or a backward rotation of the sleeve bearing.

Example 23 includes the hybrid internal combustion electric vehicle of any one of examples 15-22, further including a braking system coupled to the flow controls, wherein regulation of the forward flow provides braking force to the wheel mounting interface.

Example 24 includes the hybrid internal combustion electric vehicle of any one of examples 15-23, further including an emergency brake relief valve having a relief pressure setting that provides a braking force in the event of loss of power.

Example 25 includes the hybrid internal combustion electric vehicle of any one of examples 15-24, further including a user operated brake valve configured to modulate braking by controlling an amount of restriction to the forward flow.

Example 26 includes the hybrid internal combustion electric vehicle of any one of examples 15-25, wherein the electric generator includes a primary rotor portion, including a number of first ferrous laminations, The electric generator includes an excitation rotor portion including a number of second ferrous laminations wherein the primary rotor portion is spaced laterally apart from the excitation rotor portion by a lateral distance greater than a distance between the ferrous laminations. The electric generator includes a continuous conductor matrix joining the primary rotor portion and the excitation rotor portion, the continuous conductor matrix at least partially embedding both the number of first ferrous laminations and the number of second ferrous laminations.

Example 27 is an electric wheel drive system. The system includes an electric motor, a housing adapted for fixed operation in relation to a rotatable wheel, the housing at least partially enclosing the electric motor, a sleeve bearing, driven by the electric motor, wherein the sleeve bearing is rotatable about a support cylinder, wherein the support cylinder is fixed in relation to the housing, a wheel mounting interface coupled to the sleeve bearing, a hydraulic cylinder coupled to the housing, the hydraulic cylinder including a hydraulic cylinder housing and a hydraulic cylinder piston, wherein the housing and wheel are configured to steer a vehicle by rotation about a cylinder axis of the hydraulic cylinder, and wherein linear travel of the hydraulic cylinder is configured to provide suspension for the vehicle, and a hydraulic steering actuator coupled to the hydraulic cylinder to cause relative steering rotation between the hydraulic cylinder housing and the hydraulic cylinder piston.

Example 28 includes an electric generator. The electric generator includes a primary rotor portion, including a number of first ferrous laminations. The electric generator includes an excitation rotor portion including a number of second ferrous laminations wherein the primary rotor portion is spaced laterally apart from the excitation rotor portion by a lateral distance greater than a distance between the ferrous laminations. The electric generator includes a continuous conductor matrix joining the primary rotor portion and the excitation rotor portion, the continuous conductor matrix at least partially embedding both the number of first ferrous laminations and the number of second ferrous laminations. The electric generator includes a primary stator located around the primary rotor portion, and an excitation stator located around the excitation rotor portion.

Example 29 includes the electric generator of example 28, wherein the primary rotor portion and the excitation rotor portion are coupled to a sleeve bearing and driven by an internal combustion engine, wherein the sleeve bearing is rotatable about a support cylinder, wherein the support cylinder is fixed in relation to a fixed housing that at least partially encloses the electric generator.

Example 30 includes the electric generator of any one of examples 28-29, further including a fluid pump located within the sleeve bearing, wherein rotation of the sleeve bearing drives the fluid pump.

Example 31 includes the electric generator of any one of examples 28-30, wherein the fluid pump is adapted to pump lubricating oil, and wherein a portion of the lubricating oil lubricates an interface between the sleeve bearing and the support cylinder.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An electric wheel drive system, comprising:
   an electric motor;
   a housing adapted for fixed operation in relation to a rotatable wheel, the housing at least partially enclosing the electric motor;
   a sleeve bearing, driven by the electric motor, wherein the sleeve bearing is rotatable about a support cylinder, wherein the support cylinder is fixed in relation to the housing; and
   a wheel mounting interface coupled to the sleeve bearing.

2. The electric wheel drive system of claim 1, further including a gear reduction between the sleeve bearing and the wheel mounting interface.

3. The electric wheel drive system of claim 2, wherein the gear reduction includes a planetary gear assembly.

4. The electric wheel drive system of claim 1, further including a fluid pump located within the sleeve bearing, wherein rotation of the sleeve bearing drives the fluid pump.

5. The electric wheel drive system of claim 4, wherein the fluid pump is adapted to pump lubricating oil, and wherein a portion of the lubricating oil lubricates an interface between the sleeve bearing and the support cylinder.

6. The electric wheel drive system of claim 4, further including flow controls coupled to the fluid pump, the flow controls configured to provide forward flow from the fluid pump in either a forward rotation or a backward rotation of the sleeve bearing.

7. An electric wheel drive system, comprising:
an electric motor;
a housing adapted for fixed operation in relation to a rotatable wheel, the housing at least partially enclosing the electric motor;
a sleeve bearing, driven by the electric motor, wherein the sleeve bearing is rotatable about a support cylinder, wherein the support cylinder is fixed in relation to the housing;
a wheel mounting interface coupled to the sleeve bearing;
a hydraulic cylinder coupled to the housing, wherein the housing and wheel are configured to steer a vehicle by rotation about a cylinder axis of the hydraulic cylinder, and wherein linear travel of the hydraulic cylinder is configured to provide suspension for the vehicle.

8. The electric wheel drive system of claim 7, further including a rotational position sensor for monitoring and controlling a steering angle.

9. The electric wheel drive system of claim 8, further including a sensor for suspension.

10. The electric wheel drive system of claim 9, wherein the sensor for suspension includes a pressure sensor in communication with hydraulic fluid within the hydraulic cylinder.

11. The electric wheel drive system of claim 9, wherein the hydraulic cylinder includes a hollow piston, and wherein control wiring for the rotational position sensor and the sensor for suspension are routed through a center of the hollow piston.

12. The electric wheel drive system of claim 7, further including a fluid pump located within the sleeve bearing, wherein rotation of the sleeve bearing drives the fluid pump.

13. The electric wheel drive system of claim 12, wherein the fluid pump is adapted to pump lubricating oil, and when in operation, a portion of the lubricating oil lubricates an interface between the sleeve bearing and the support cylinder.

14. The electric wheel drive system of claim 13, wherein a portion of the lubricating oil is diverted to operate a suspension function of the hydraulic cylinder.

15. A hybrid internal combustion electric vehicle, comprising:
an internal combustion engine;
an electric generator coupled to an output shaft of the internal combustion engine;
one or more electric wheel drive systems mechanically coupled to a vehicle frame, and electrically coupled to the electric generator, the electric wheel drive system including:
an electric motor;
a housing adapted for fixed operation in relation to a rotatable wheel, the housing at least partially enclosing the electric motor;
a sleeve bearing, driven by the electric motor, wherein the sleeve bearing is rotatable about a support cylinder, wherein the support cylinder is fixed in relation to the housing; and
a wheel mounting interface coupled to the sleeve bearing.

16. The hybrid internal combustion electric vehicle of claim 15, further including multiple internal combustion engines and corresponding electric generators electrically wired in parallel.

17. The hybrid internal combustion electric vehicle of claim 15, wherein the one or more electric wheel drive systems, includes at least four electric wheel drive systems, wherein each electric wheel drive systems is configured to be independently steered.

18. The hybrid internal combustion electric vehicle of claim 17, further including a hydraulic cylinder coupled between each housing and the vehicle frame, wherein the housing and wheel are configured to steer a vehicle by rotation about a cylinder axis of each hydraulic cylinder, and wherein linear travel of each hydraulic cylinder is configured to provide suspension for the vehicle.

19. The hybrid internal combustion electric vehicle of claim 18, further including a fluid pump located within the sleeve bearing, wherein rotation of the sleeve bearing drives the fluid pump.

20. The hybrid internal combustion electric vehicle of claim 19, wherein the fluid pump is adapted to pump lubricating oil, and when in operation, a portion of the lubricating oil lubricates an interface between the sleeve bearing and the support cylinder.

21. The hybrid internal combustion electric vehicle of claim 20, wherein a portion of the lubricating oil is diverted to operate a suspension function of the hydraulic cylinder.

22. The hybrid internal combustion electric vehicle of claim 19, further including flow controls coupled to the fluid pump, the flow controls configured to provide forward flow from the fluid pump in either a forward rotation or a backward rotation of the sleeve bearing.

23. The hybrid internal combustion electric vehicle of claim 22, further including a braking system coupled to the flow controls, wherein regulation of the forward flow provides braking force to the wheel mounting interface.

24. The hybrid internal combustion electric vehicle of claim 23, further including an emergency brake relief valve having a relief pressure setting that provides a braking force in the event of loss of power.

25. The hybrid internal combustion electric vehicle of claim 23, further including a user operated brake valve configured to modulate braking by controlling an amount of restriction to the forward flow.

26. The hybrid internal combustion electric vehicle of claim 15, wherein the electric generator includes:
a primary rotor portion, including a number of first ferrous laminations
an excitation rotor portion including a number of second ferrous laminations wherein the primary rotor portion is spaced laterally apart from the excitation rotor portion by a lateral distance greater than a distance between the ferrous laminations; and
a continuous conductor matrix joining the primary rotor portion and the excitation rotor portion, the continuous conductor matrix at least partially embedding both the number of first ferrous laminations and the number of second ferrous laminations.

27. An electric wheel drive system, comprising:
an electric motor;

a housing adapted for fixed operation in relation to a rotatable wheel, the housing at least partially enclosing the electric motor;

a sleeve bearing, driven by the electric motor, wherein the sleeve bearing is rotatable about a support cylinder, wherein the support cylinder is fixed in relation to the housing;

a wheel mounting interface coupled to the sleeve bearing;

a hydraulic cylinder coupled to the housing, the hydraulic cylinder including a hydraulic cylinder housing and a hydraulic cylinder piston;

wherein the housing and wheel are configured to steer a vehicle by rotation about a cylinder axis of the hydraulic cylinder, and wherein linear travel of the hydraulic cylinder is configured to provide suspension for the vehicle; and a hydraulic steering actuator coupled to the hydraulic cylinder to cause relative steering rotation between the hydraulic cylinder housing and the hydraulic cylinder piston.

* * * * *